United States Patent
Samsonowicz et al.

(10) Patent No.: US 12,547,785 B2
(45) Date of Patent: Feb. 10, 2026

(54) MULTI SURFACE PATTERNING DRIVEN BY CURVE(S)

(71) Applicant: Autodesk, Inc., San Francisco, CA (US)

(72) Inventors: Andrzej Jan Samsonowicz, Warsaw (PL); Michael Guenther-Geffers, Hannover (DE)

(73) Assignee: AUTODESK, INC., San Francisco, CA (US)

( * ) Notice: Subject to any disclaimer, the term of this patent is extended or adjusted under 35 U.S.C. 154(b) by 629 days.

(21) Appl. No.: 17/039,415

(22) Filed: Sep. 30, 2020

(65) Prior Publication Data
US 2022/0100929 A1 Mar. 31, 2022

(51) Int. Cl.
*G06F 30/10* (2020.01)
*G06T 17/30* (2006.01)

(52) U.S. Cl.
CPC .............. *G06F 30/10* (2020.01); *G06T 17/30* (2013.01)

(58) Field of Classification Search
CPC .......... G06F 30/23; G06F 30/12; G06F 30/25; G06F 30/367; G06F 30/398; G06F 2111/00; G06F 2111/02; G06F 2111/04; G06F 2111/06; G06F 2111/08; G06F 2111/10; G06F 2111/12; G06F 2111/14; G06F 2111/16; G06F 2111/18; G06F 2111/20; G06F 2113/00; G06F 2113/02; G06F 2113/04; G06F 2113/06; G06F 2113/08; G06F 2113/10; G06F 2113/12; G06F 2113/14; G06F 2113/16; G06F 2113/18; G06F 2113/20; G06F 2113/22; G06F 2113/24; G06F 2113/26; G06F 2113/28; G06F 2115/00; G06F 2115/02; G06F 2115/04; G06F 2115/06; G06F 2115/08; G06F 2115/10; G06F 2115/12; G06F 2117/00; G06F 2117/02; G06F 2117/04; G06F 2117/06; G06F 2117/08; G06F 2117/10; G06F 2117/12; G06F 2119/00; G06F 2119/02; G06F 2119/04; G06F 2119/06; G06F 2119/08; G06F 2119/10; G06F 2119/12; G06F 2119/14; G06F 2119/16; G06F 2119/18; G06F 2119/20;
(Continued)

(56) References Cited

PUBLICATIONS

"Curve Driven Patterns and the Curve Driven Pattern PropertyManager—2019—Solidworks Help." Help.solidworks.com, help.solidworks.com/2019/english/SolidWorks/sldworks/t_Curve_Driven_Pattern_Overview.htm. Accessed Jun. 13, 2022. (Year: 2019).*

(Continued)

*Primary Examiner* — John E Johansen
(74) *Attorney, Agent, or Firm* — Gates & Cooper LLP

(57) ABSTRACT

A method and system provide for multi-surface patterning. An input target multi-surface consisting of multiple target surfaces is obtained. A first guide curve is obtained. A pattern is obtained. One or more section planes are created based on the pattern and the first guide curve. The one or more section planes are intersected with each of the multiple target surfaces resulting in an intersection curve for each of the multiple target surfaces. A single continuous curve is created from the intersecting curves. Points are generated based on the continuous curve, the first guide curve, and the pattern. An object is generated and placed based on the points.

24 Claims, 13 Drawing Sheets

(58) Field of Classification Search
CPC ...... G06F 2119/22; G06F 30/00; G06F 30/17; G06F 30/18; G06F 30/10; G06T 11/203; G06T 17/10; G06T 17/30
USPC .......................................................... 703/2
See application file for complete search history.

(56) References Cited

PUBLICATIONS

"Creating Multi-Sections Surfaces." Catiadoc.free.fr, catiadoc.free.fr/online/cfyug_C2/cfyugloft.htm. Accessed Jun. 14, 2022. (Year: 2019).*

"Solidworks Sketch vs Table vs Variable Patterns." The Javelin Blog, Jul. 29, 2017, www.javelin-tech.com/blog/2017/07/Solidworks-sketch-patterns/. Accessed Jun. 13, 2022. (Year: 2017).*

Deschatelets, Bruno. "Understanding UV Mapping and Textures." Spiria, Apr. 25, 2016, www.spiria.com/en/blog/desktop-software/understanding-uv-mapping-and-textures/. (Year: 2016).*

"API: OpenSim::SegmentedQuinticBezierToolkit Class Reference." Simtk.org, simtk.org/api_docs/opensim/api_docs/classOpenSim_1_1SegmentedQuinticBezierToolkit.html. Accessed Jun. 14, 2022. (Year: 2019).*

"Bridge Curve Siemens NX—Cad Cam Engineering WorldWide." Web.archive.org, Nov. 15, 2017, web.archive.org/web/20171115075327/cadcamengineering.net/bridge-curve-siemens-nx/. Accessed Jun. 13, 2022. (Year: 2017).*

"Texture Mapping | Rhino 3-D Modeling." Docs.mcneel.com, docs.mcneel.com/rhino/5/help/en-us/properties/texturemapping.htm. Accessed Jun. 10, 2022. (Year: 2015).*

The Javelin Blog. "Solidworks 2020 Torsion Continuity Relation (G3)." The Javelin Blog, Dec. 19, 2019, www.javelin-tech.com/blog/2019/12/solidworks-2020-torsion-continuity-relation-g3/. Accessed Jun. 14, 2022. (Year: 2019).*

Zhu, Chun-Gang, et al. "Functional Splines with Different Degrees of Smoothness and Their Applications." Computer-Aided Design, vol. 40, No. 5, May 1, 2008, pp. 616-624 (Year: 2008).*

"UV mapping", https://en.wikipedia.org/wiki/UV_mapping, Wikipedia, last edited on Nov. 19, 2020.

* cited by examiner

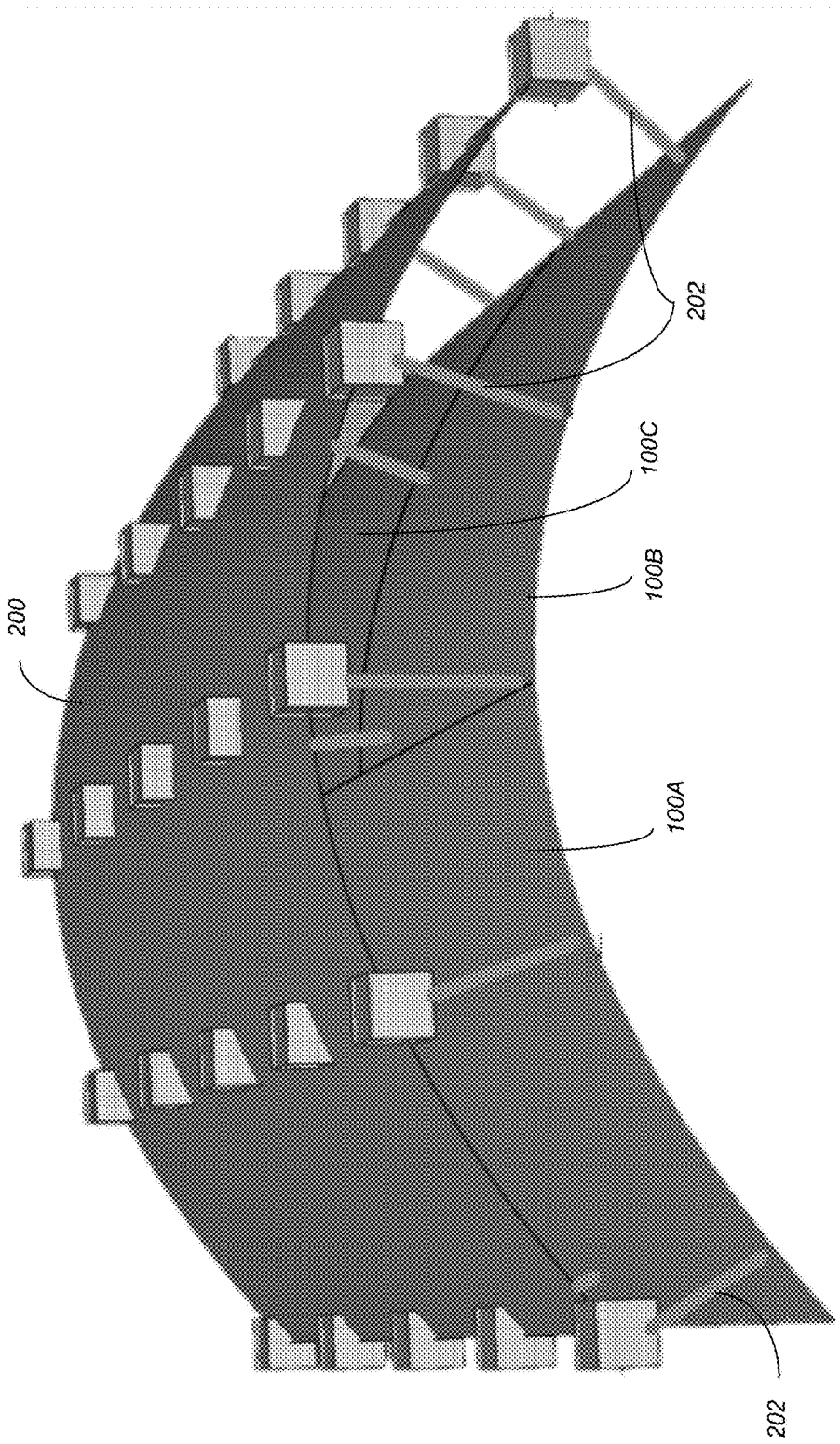
FIG. 2
(Prior Art)

MULTI SURFACE PATTERNING DRIVEN BY CURVE(S)

BACKGROUND OF THE INVENTION

1. Field of the Invention

The present invention relates generally to distributing objects onto one or more three-dimensional (3D) surfaces, and in particular, to a method, system, apparatus, and article of manufacture for distributing objects based on a pattern onto one or more 3D surfaces.

2. Description of the Related Art

Architects, designers, and other users often desire to place an object of their choice (e.g., a company logo modeled in 3D) onto multiple positions of one or multiple surfaces (e.g., complex 3D surface computer-aided design (CAD) data/models). These target surfaces on which the object shall be mapped onto are often connected (i.e., they define a closed topology), but not always (e.g., there may be wanted or unwanted holes and/or gaps). The pattern on how to distribute the objects may consist of anything, from a regular grid distribution, to circular arrangements, to any type of pattern distribution that can be imagined. With a specific pattern in mind, users can imagine how the pattern appears on a planar rectangular surface (which can be visualized as a bedsheet), another geometric plane, or for visualization—how the pattern is drawn on a planar sheet. In the end, the objects (e.g., a 3D company logo), for which the distribution is based on the pattern, have to be placed onto 3D CAD surface data (e.g., the interior of a car). This 3D CAD surface data usually consists of dozens, if not hundreds of surfaces (that may also be trimmed). Accordingly, the surfaces may not share a common parameter (e.g., mathematical UV) space, which would facilitate the easy distribution of objects based on the pattern (e.g., as they have been drawn on a planar sheet). To better understand the problem, a description of prior art approaches to placing 3D objects onto 3D surface CAD data may be useful.

Most of the time, the target topology onto which the object(s) shall be placed consists of multiple surfaces. Over multiple surfaces, an arc length based pattern distribution cannot easily be realized. Such patterns may be arbitrary or defined via a grid or other geometric shape. FIG. 1A illustrates an exemplary target surface 100 (consisting of three connected surfaces 100A-100C) with an object 102 to be mapped onto the surface 100 in an arbitrary pattern (i.e., in locations 102P). More specifically, the object 102 consists of a cube to be placed/mapped onto target surface 100 based on an arbitrary pattern. FIG. 1B illustrates an exemplary target surface 100 with an object 102 to be mapped onto the surface 100 in a grid pattern. As illustrated surface 100 has a 5×11 grid pattern such that there are 55 objects 102P that have been mapped onto it.

The problem is usually solved (e.g., in texture mapping) by creating one additional single surface, onto which the 3D object(s) 102 can easily be distributed. The object(s) 102 to be placed are then projected from this one single surface to the actual target surfaces 100. FIG. 2 illustrates a correspondence between a created additional single surface 200 and the actual target multiple surfaces 100 to which the objects 102 will be mapped in accordance with the prior art. In particular, FIG. 2 illustrates a newly created surface 200 with the objects 102 mapped thereon. The objects on the single surface 200 are projected (as illustrated by lines 202) to the actual target surfaces 100A-100C. This approach has several issues:

(1) The additional surface 200 has to be created first. Such a creation requires a significant amount of manual work (depending on the complexity of the shape of the target surfaces 100), or, in the case of an automatic approximation, it is prone to poor results, especially in case the target surfaces 100 have a more complicated shape. For example, the manual work may consist of manually creating resizing, rotating, and translating a rectangular plane (including a repeat of each of these steps) until is approximates a target surface 100 followed by further manipulating (e.g., pulling, squashing, and/or deforming) the plane to more closely approximate the target surfaces 100.

(2) The approach is not exact, as the one single surface 200 can only approximate the target surfaces 100 up to a certain tolerance. The further away this additional surface 200 is from the target surfaces 100, the more the projection executed afterwards may lead to a certain distortion for the wanted pattern distribution.

In view of the above, the prior art fails to provide the capability to easily, quickly and precisely place object(s) onto a target surface based on a pattern.

SUMMARY OF THE INVENTION

Embodiments of the invention overcome the problems of the prior art using an effective mapping method between an easy to do and easy to visualize pattern distribution on a single, non-trimmed surface, to any kind of 3D surface CAD data. Embodiments may be enabled using a script that may define to general "modes". A user merely defines a single curve, that is running along one side of a 3D CAD surface data. This curve defines the U space for a pattern distribution. The start of the curve is U value 0, the end corresponds to U value 1. Based on this curve, planes that are perpendicular to this curve can be calculated (plane normal is tangent to the curve). These planes are then intersected with the surfaces. The intersection curves for each plane are sorted, merged if they are position continuous, or, if not, connected to each other by G1 continuous curve blends. This way, each U point on the curve defines one plane, which creates one section, which produces one curve. These curves define the V space of a pattern (the longest curve arc length equals V=1). This general approach allows the user to control pattern distribution by modifying a single curve.

Additional embodiments utilize a second curve in which planes are not calculated to be perpendicular to the first curve. Instead, planes would run from U1=0 of the first curve to U2=0 of the second curve. The two curves can be viewed as defining the left and right side of a geometric (e.g., rectangular) pattern, while everything in between is defined/calculated by the intersection curves the planes create.

BRIEF DESCRIPTION OF THE DRAWINGS

Referring now to the drawings in which like reference numbers represent corresponding parts throughout:

FIG. 2 illustrates a correspondence between a created additional single surface and the actual target multiple surfaces to which the objects will be mapped in accordance with the prior art;

DETAILED DESCRIPTION OF THE PREFERRED EMBODIMENTS

Figure 1A:
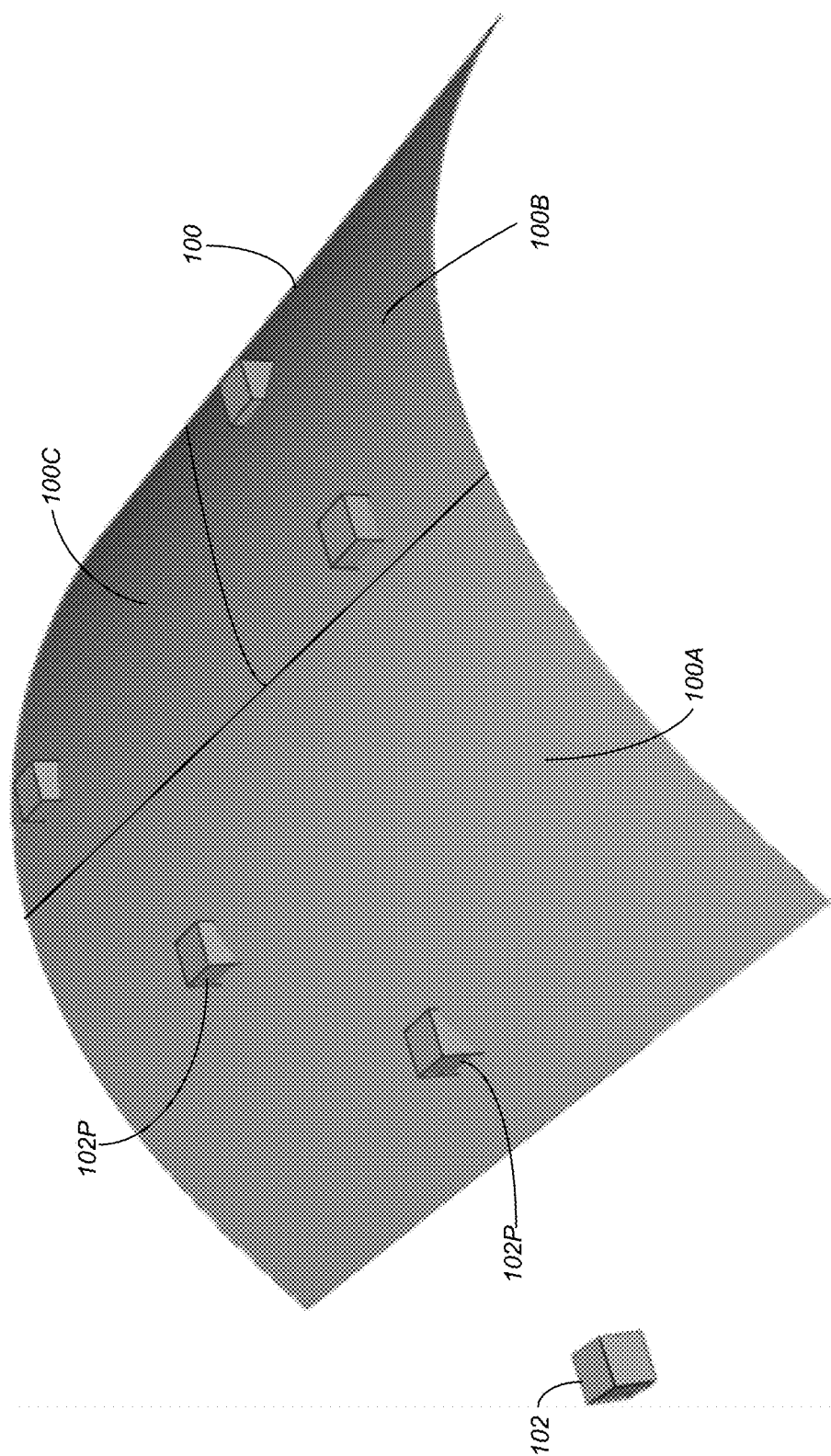
FIG. 1A illustrates an exemplary target surface with an object to be patterned onto the surface in an arbitrary pattern in accordance with one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.
Overview As described above, embodiments of the invention provide an effective mapping method between the easy to do and easy to visualize pattern distribution on a planar surface, to any kind of 3D surface CAD data. Embodiments map each point from the planar surface, which has a UV parameter space from 0 to 1, to a "natural" corresponding point on 3D target surface data. As used herein, "natural" means that the pattern distribution on the surface data is what the user would expect when covering the target surfaces with the approximate surface.

There are two different general "modes" that may provide the desired functionality. In a first mode, a user acquires a curve that is running along side of the 3D CAD target surface data. The curve defines the U space for the pattern distribution. The start of the curve is U value 0, the end corresponds to U value 1. Based on this curve, planes that are perpendicular to the curve are calculated (plane normal is tangent to the curve). The planes are then intersected with the target surfaces. The intersection curves for each plane are sorted, merged if they are position continuous, or, if not, connected to teach other by G1 continuous curve blends. As used herein, G0 or point continuity is when one surface or curve touches another and they share the same boundary. G1 or tangent/angular continuity implies that two faces/surfaces meet along a common edge and that the tangent plane, at each point along the edge, is equal for both faces/surfaces (they share a common angle). Thus, each U point on the curve defines one plane that creates one section, which produces one curve. These curves define the V space of the approximate surface (the longest curve arc length equals V=1). In this mode, the user may control pattern distribution by modifying a single curve.

In the second mode, a second curve is utilized. However, differing from the first mode, the calculated planes are not calculated to be perpendicular to the first curve. Instead, the calculated planes run from a first vector from U1=0 of the first curve to U2=0 of the second curve, and from U1=0.1 to U2=0.1, and continuing until U1=1 to U2=1. In addition, a needed second vector for the planes is created by rotating the tangent direction at each U1 point by ninety (90) degrees around the first obtained vector. Accordingly, the two curves may be imagined as defining the left and right side of the approximate surface (e.g., a sheet), while everything in between is defined/calculated by the intersection curves the planes create.

The ability to use the shape of one (or two) curve(s) to easily distribute a pattern over any kind of surface topology, without having to write custom code for each specific surface topology input, results in a significant improvement in the speed of the process. Without the functionality as described herein, people may be able to create objects of all kinds of sizes and shapes, but are unable to easily place them on 3D target surface data. In this regard, only being able to create many objects, without being able to place them, reduces the effectiveness of parametric object generation applications.

Detailed Logical Flow

Figure 3:
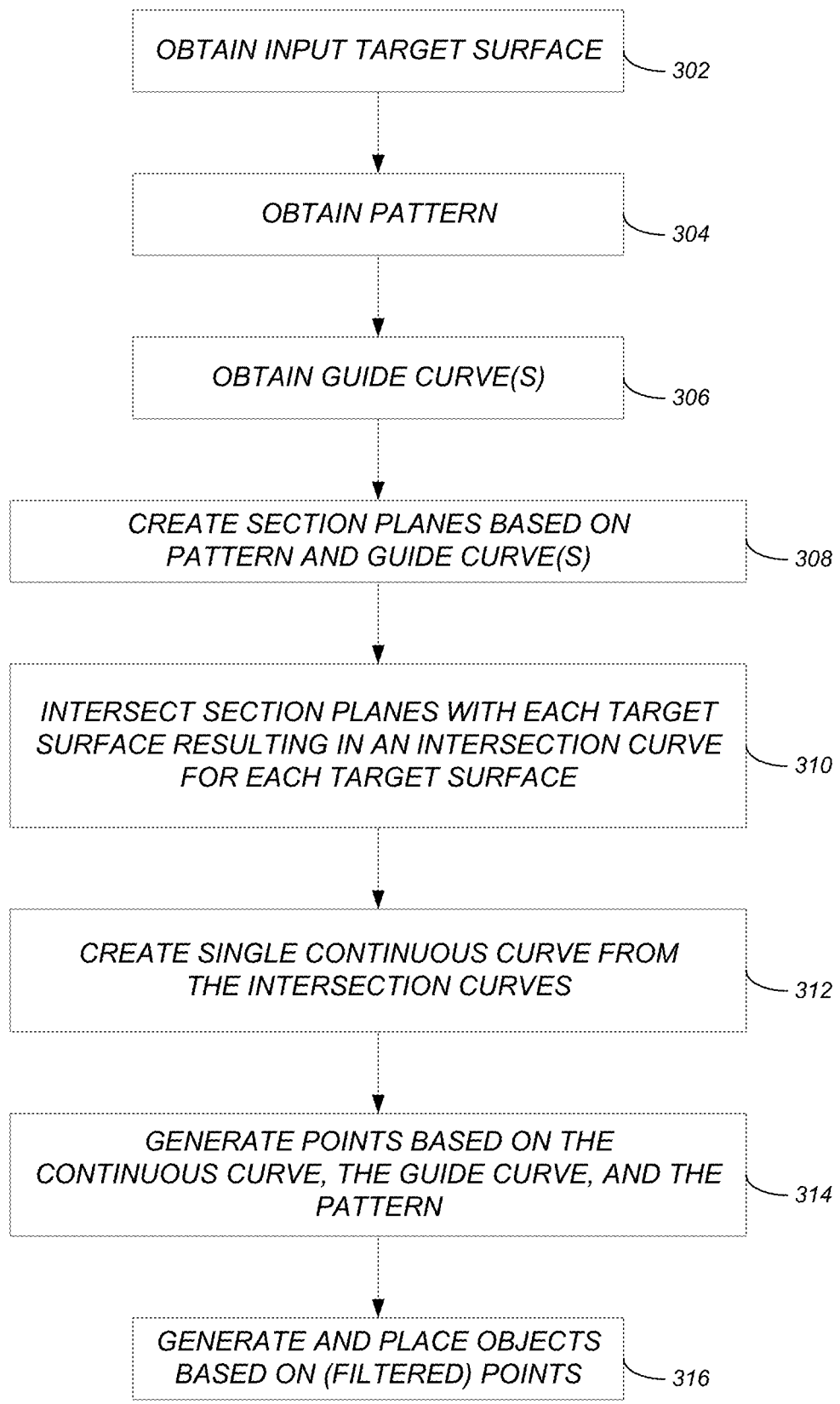
FIG. 3 illustrates the logical flow for multi surface patterning in accordance with one or more embodiments of the invention.

FIG. 3 illustrates the logical flow for multi surface patterning in accordance with one or more embodiments of the invention.

At step 302, an input target multi-surface is obtained. The input target multi-surface can consist of multiple target surfaces.

At step 304, a pattern is obtained (e.g., specified with respect to UV space). As described above, the pattern may be arbitrary or may be defined (e.g., may be a grid pattern with points equally distributed across columns and rows)

Figure 1B:
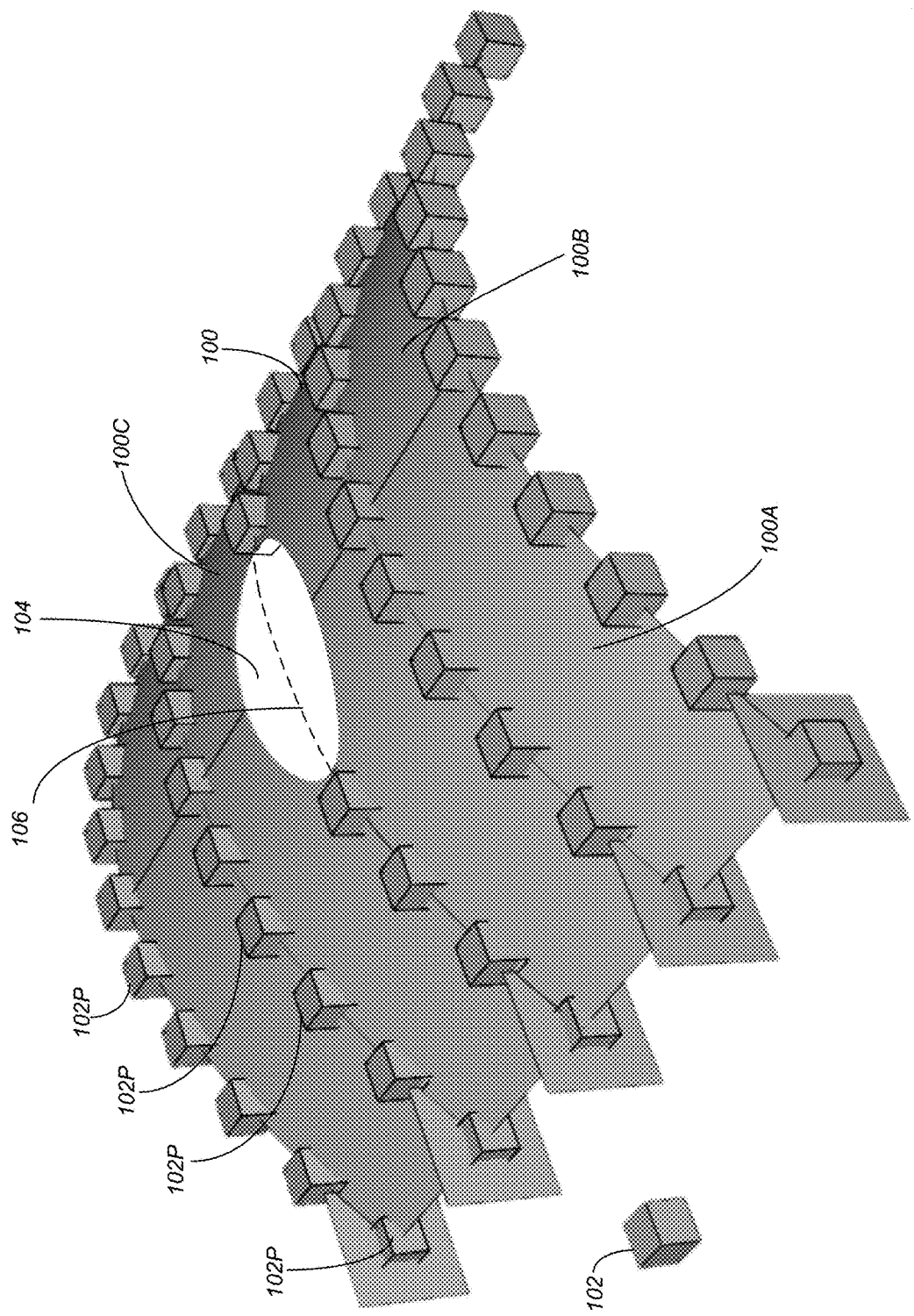
FIG. 1B illustrates an exemplary target surface with an object to be mapped onto the surface in a grid pattern in accordance with one or more embodiments of the invention.
Figure 4:
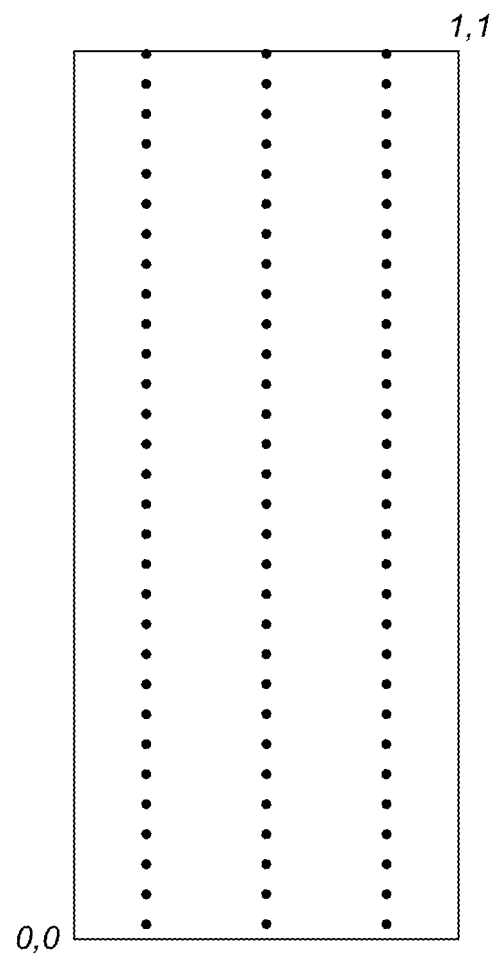
FIG. 4 illustrates a two-dimensional (2D) view of pattern points in accordance with one or more embodiments of the invention.

(e.g., via a cross-product of a set of UV points). The pattern may be automatically generated, may be generated using CSV files, or may be manually specified. FIG. 1A illustrates an arbitrary pattern and FIG. 1B illustrates a defined (grid) pattern. FIG. 4 illustrates a two-dimensional (2D) view of pattern points in accordance with one or more embodiments of the invention. The pattern is specified with respect to UV space with the lower left corner at 0,0 and the upper right corner at 1,1. UV space commonly relates to the concept of UV mapping that defines the relationship between a 3D model and a texture that is mapped onto that model. Based on a 0 to 1 grid, with 0.5 as the middle coordinates, a UV map consists of a 3D model's XYZ coordinates flattened into 2D UVW space (or tile). Depending on the modeler and mapper used, a 3D model's horizontal x-axis equals U in 2D space, vertical equals V, and the depth coordinate z equals W. The mapping of coordinates is how 3D space translates into flattened 2D space.

Figure 6:
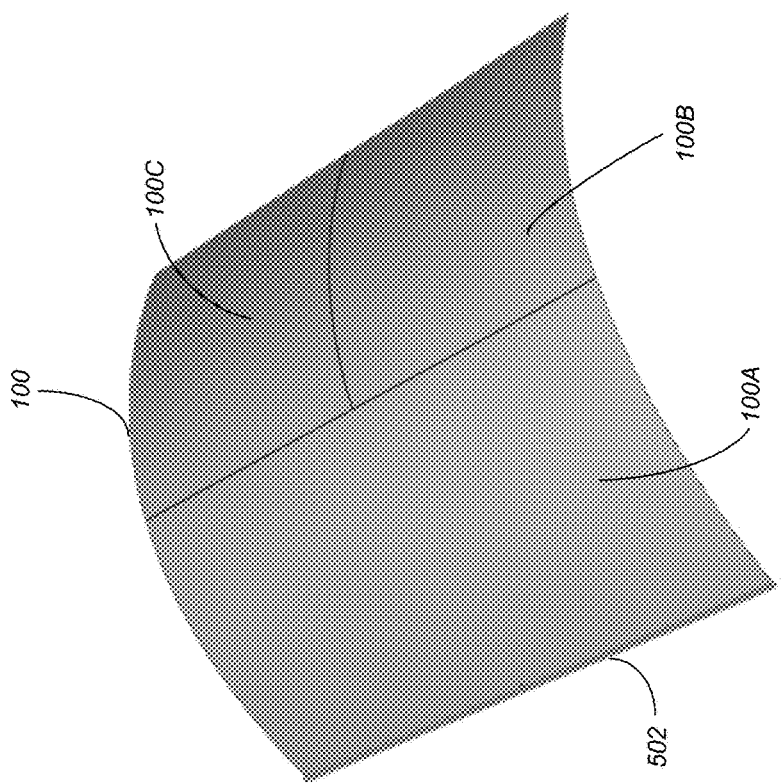
FIG. 6 illustrates the 3D input target multi-surface of FIG. 1A with a guide curve that has been obtained in accordance with one or more embodiments of the invention.
Figure 5:
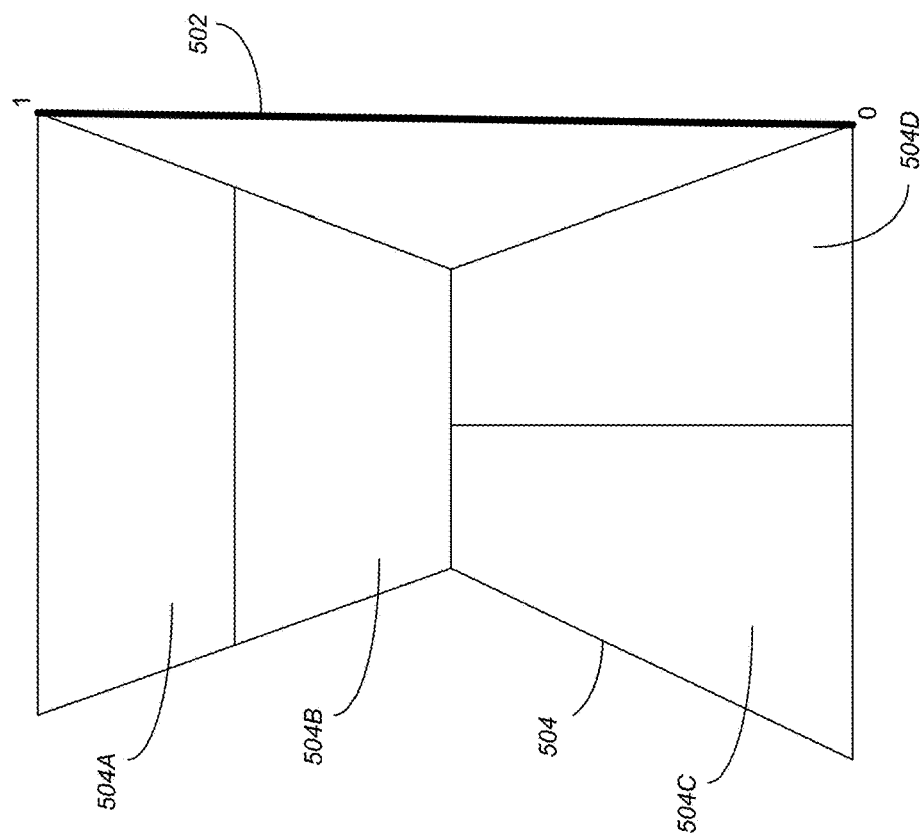
FIG. 5 illustrates a first guide curve in accordance with one or more embodiments of the invention.

At step 306, a first guide curve is obtained (and may be obtained independently from the input target multi-surface or may be selected from an edge of the input target multi-surface). FIG. 5 illustrates a first guide curve in accordance with one or more embodiments of the invention. The guide curve 502 has been obtained/generated/acquired with respect to the input target multi-surface 504 (i.e., the surfaces 504 to pattern). The target multi-surface 504 consists of four different surfaces 504A-504D. The guide curve 502 provides an implicit U-value of each point to be placed (i.e., 0 to 1). FIG. 6 illustrates the 3D input target multi-surface 100 of FIG. 1A with a guide curve 502 that has been obtained in accordance with one or more embodiments of the invention. The guide curve 502 may be drawn manually or may be selected from an existing edge of multi-surface. Further, as described herein, a second guide curve may also be obtained.

Figure 8:
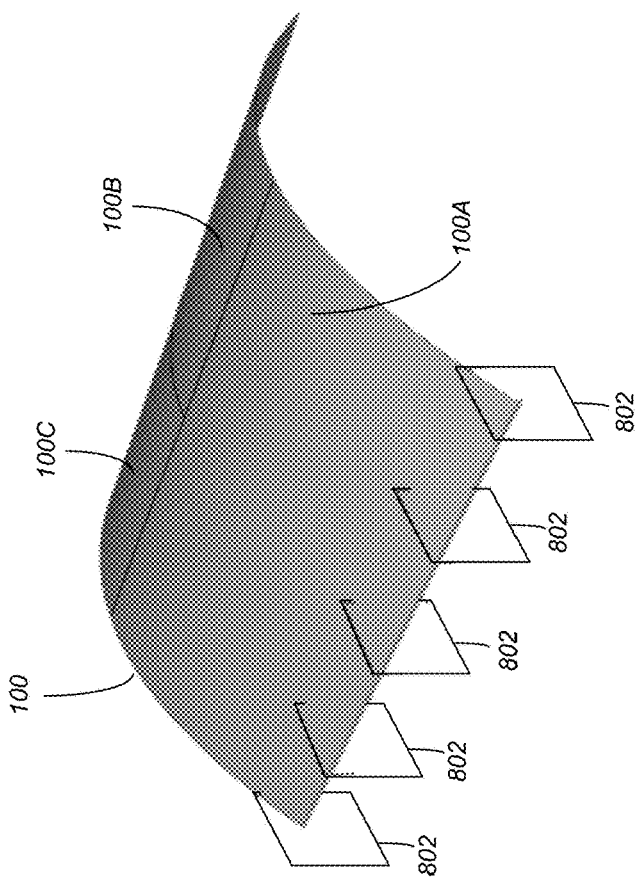
FIG. 8 illustrates a 3D view of section planes that have been generated on the guide curves of FIG. 1B in accordance with one or more embodiments of the invention.
Figure 7:
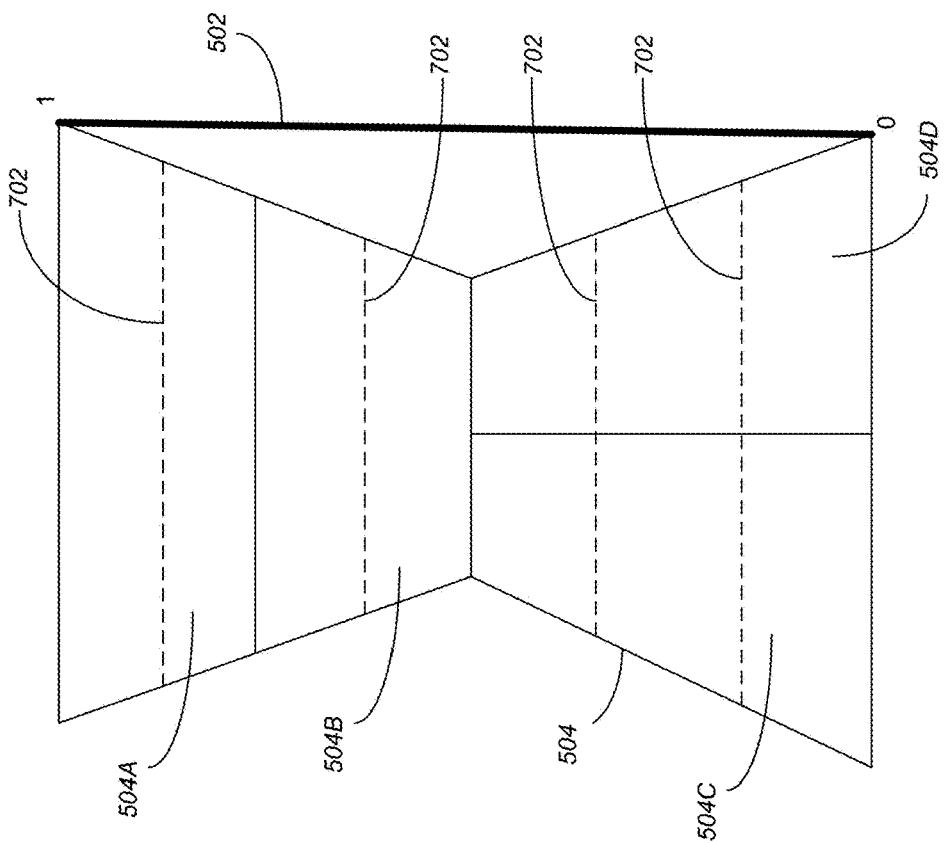
FIG. 7 illustrates a 2D view of section planes that have been generated in accordance with one or more embodiments of the invention.

At step 308, one or more section planes are created based on the pattern and the first guide curve. In this regard, along the guide curve 502, section planes are created. As an example, if the pattern includes five (5) "rows" of cubes to be placed, five (5) section planes may be calculated/created/generated. The normal of those section planes is the tangent of the guide curve 502 at the point the section plane is placed. FIG. 7 illustrates a 2D view of section/intersection curves 702 that have been generated in accordance with one or more embodiments of the invention. FIG. 8 illustrates a 3D view of section planes 802 that have been generated on the multi-surface 100 of FIGS. 1A and 1B in accordance with one or more embodiments of the invention. In this regard, the number of section planes 802 that are created may be based on the points of the pattern (e.g., a separate section plane 802 for each point may be created and/or a section plane 802 may be created for each U-value of points in the pattern).

Figure 9:
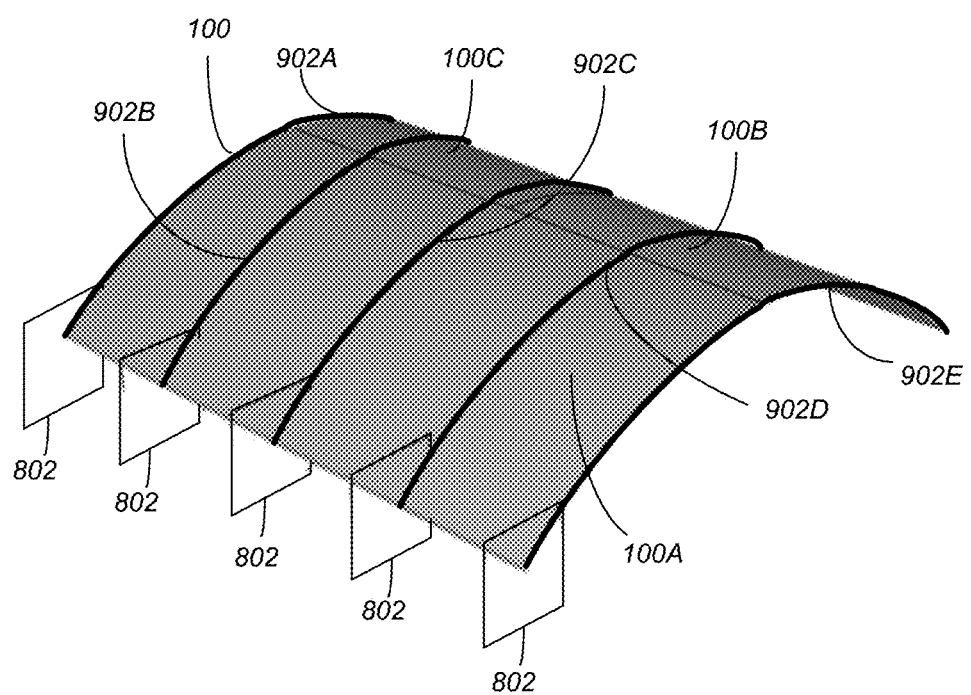
FIG. 9 illustrates the intersection curves resulting from the intersection of section planes with the input target surfaces in accordance with one or more embodiments of the invention.

At step 310, the one or more section planes 802 are intersected with each of the multiple target surfaces 100/504 resulting in an intersection curve 702 for each of the multiple target surfaces 100/504. In this regard, the section planes 802 are intersected with the target surfaces 100/504 for the pattern placement. The result for each section plane 802 can be several intersection curves 702, and, depending on the topology of the target surfaces 100/504, these intersection curves 702 may have gaps. FIG. 9 illustrates the intersection curves 902A-902E (collectively referred to as intersection curves 902) resulting from the intersection of section planes 802 with the input target surfaces 100 in accordance with one or more embodiments of the invention. In some cases, there may be gaps between the input target surfaces 100. Such gaps may be intentional (e.g., if a hole or window is desired), or may be unintentional where surfaces don't line up perfectly (e.g., microgaps that are 10,000$^{th}$ or a 10$^{th}$ of a millimeter). FIG. 1B illustrates an intentional gap 104 (i.e., a hole) of multiple target surfaces 100.

At step 312, a single continuous curve is created from the intersecting curves 902. In other words, the system sorts the intersection curves 902 and creates a single continuous intersection curve for each section plane 802. Such a single continuous intersection curve may consist of the intersection curves 902 plus additional bridging curves that bridge the possible gaps between intersection curves 902. FIG. 1B illustrates such an intentional gap 104 with the bridging curve 106. In embodiments of the invention, the bridging curves 106 may be generated and are used to connect the intersection curves 902.

Steps 310 and 312 may be viewed as a first step where a single intersection curve 902 is identified for each surface (along the section plane 802) (i.e., at step 310), and then those intersection curves 902 are connected including generating a missing/bridge curve to span any identified gaps (i.e., at step 312).

At step 314, points are generated based on the continuous curve, the first guide curve, and the pattern. In this regard, the continuous curve (and pattern) are used to identify the points where objects will be precisely placed (e.g., using an arc length placement on the curve). Step 314 may also include the filtering out of points that do not lie on an input target multi-surface. For example, all points on the continuous curve are computed and points that don't actual intersect with the input target surface may be filtered out (e.g., points that lie on trimmed regions). Accordingly, each pattern point provides a UV value pair on the planar sheet. The U-value (from the UV value pair in the pattern) is mapped to the guide curve, and the V-value (from the UV value pair in the pattern) is mapped to the extended intersection curve/single continuous curve, which, together, will define the final 3D position for that pattern point.

At step 316, an object (i.e., multiple instances of an objects) is generated and placed based on the (filtered) points. Thus, for the points that have been generated and remain, instances of a designated object may be placed on each point. FIG. 1B illustrates an exemplary result of the generation and placement of cuboid objects 102 on the target surfaces 100 based on a pattern (while not generating and placing such objects 102 in the gap area 104).

The approach outlined in FIG. 3 is faster (only one or two curve(s) are needed, instead of a complete surface), and more exact than the approaches of the prior art described above.

In addition to the above, various use cases (i.e., squeeze-and-cut and pattern repetition/stretch and squeeze [described below]) provide flexibility and customizability regarding how to perform the surface patterning (that was not available in the prior art). More specifically, while FIG. 1B illustrates one use case for multi-surface patterning, occasions may arise where the total input pattern is a different size/orientation than that of the target surfaces. Alternatively, there may be an occasion where it is desirable to modify how the pattern is projected onto a target surface. In such situations, it may be desirable to either squeeze/stretch the pattern onto the target surface proportionally, or alternatively, to maintain the pattern spacing and cut points from the pattern that do not fall on a target surface. Each of these different options are described in further detail below.

Stretch and Squeeze Use Case

Figure 11:
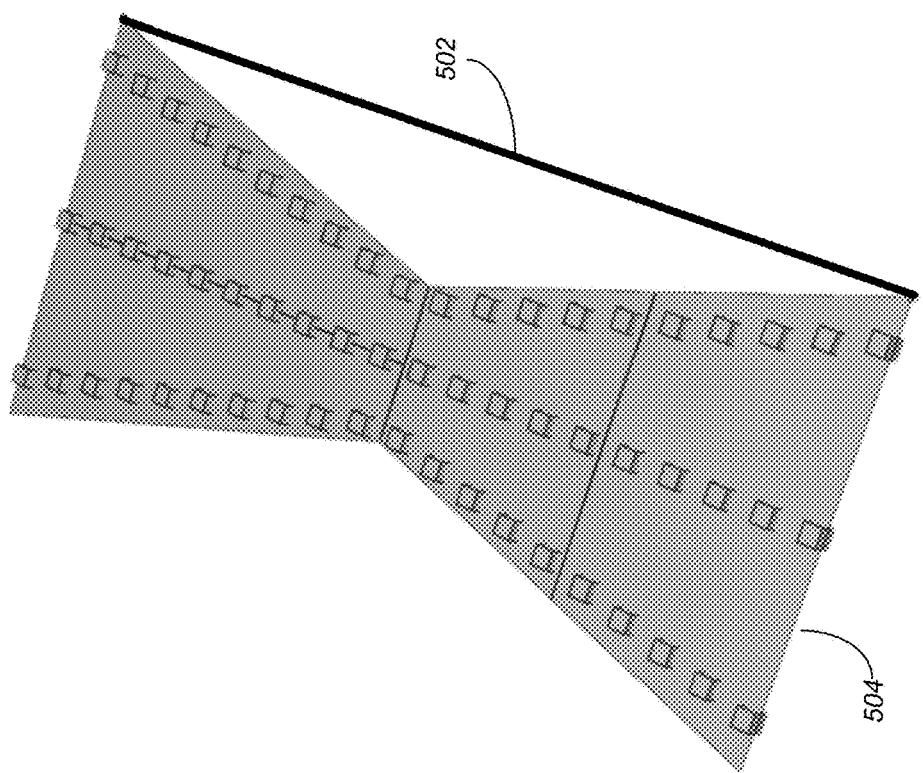
FIG. 11 illustrates an isometric view of the 3D multi-surface patterning results of cuboid objects patterned onto a target surface based on the stretching and squeezing of FIG. 10.
Figure 10:
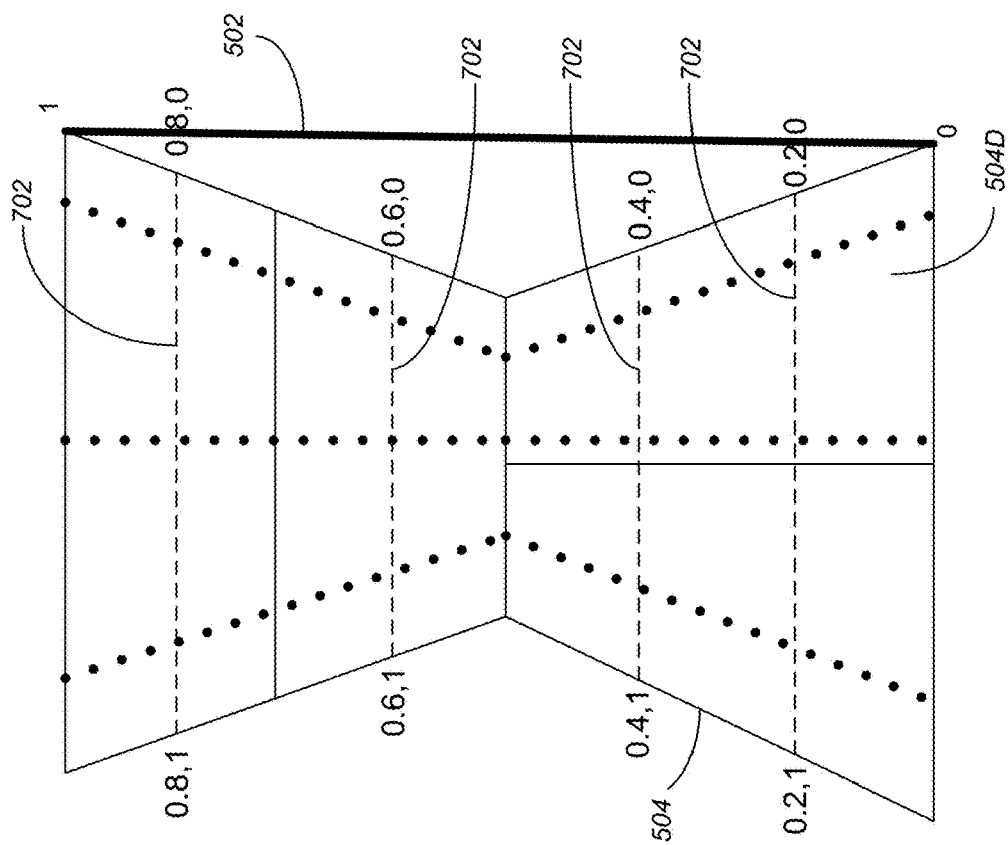
FIG. 10 illustrates the stretching and squeezing of the pattern of FIG. 4 onto target surfaces based on section planes in accordance with one or more embodiments of the invention.

For purposes of illustration the pattern of FIG. 4 is being utilized. FIG. 10 illustrates the stretching and squeezing of the pattern of FIG. 4 onto target surfaces 504 based on section planes 802 (e.g., based on a geometry of the input target surface 504 and the continuous curve) in accordance with one or more embodiments of the invention (e.g., steps 314-316). Similarly, FIG. 11 illustrates an isometric view of the 3D multi-surface patterning results of cuboid objects patterned onto a target surface based on the stretching and squeezing of FIG. 10. As illustrated, a single guide curve 502 is utilized. Only the really intersecting parts of the section planes 802 (controlled by the guide curve 502) are considered. The complete pattern distribution (i.e., from U=0, V=0, to U=1, V=1) from the pattern of FIG. 4 is applied to the multiple surfaces 504 of FIGS. 10 and 11. In other words, the surface base pattern of FIG. 4 is stretched or squeezed (whatever is needed) to completely end up on the surfaces 504 to be patterned. As illustrated, the U-value (from 0 to 1) is acquired from the pattern and mapped to the guide curve 502 (i.e., where the section planes 802 intersect with the guide curve 502) and the V-value (from 0 to 1) for each point is determined from pattern and mapped to the corresponding single continuous intersection curve. In other words, each pattern point provides a UV value pair, which is then mapped in 3D space, using the guide curve 502 for U position, and the corresponding intersection curve 702 for the V value, both together defining the 3D point which belongs to the UV value pair of the input target multi-surface to be patterned.

Cut/Multi-Curve Use Case

Figure 13:
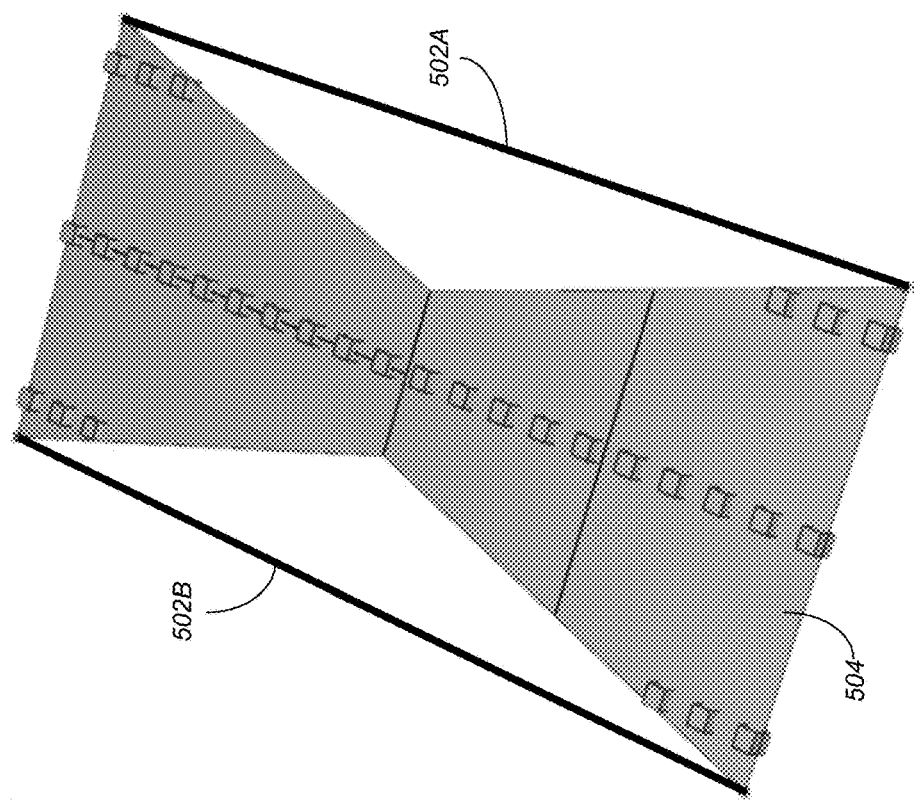
FIG. 13 illustrates an isometric view of the 3D multi-surface patterning results of cuboid objects patterned onto a target surface based on the cut option illustrated in FIG. 12 in accordance with one or more embodiments of the invention.
Figure 12:
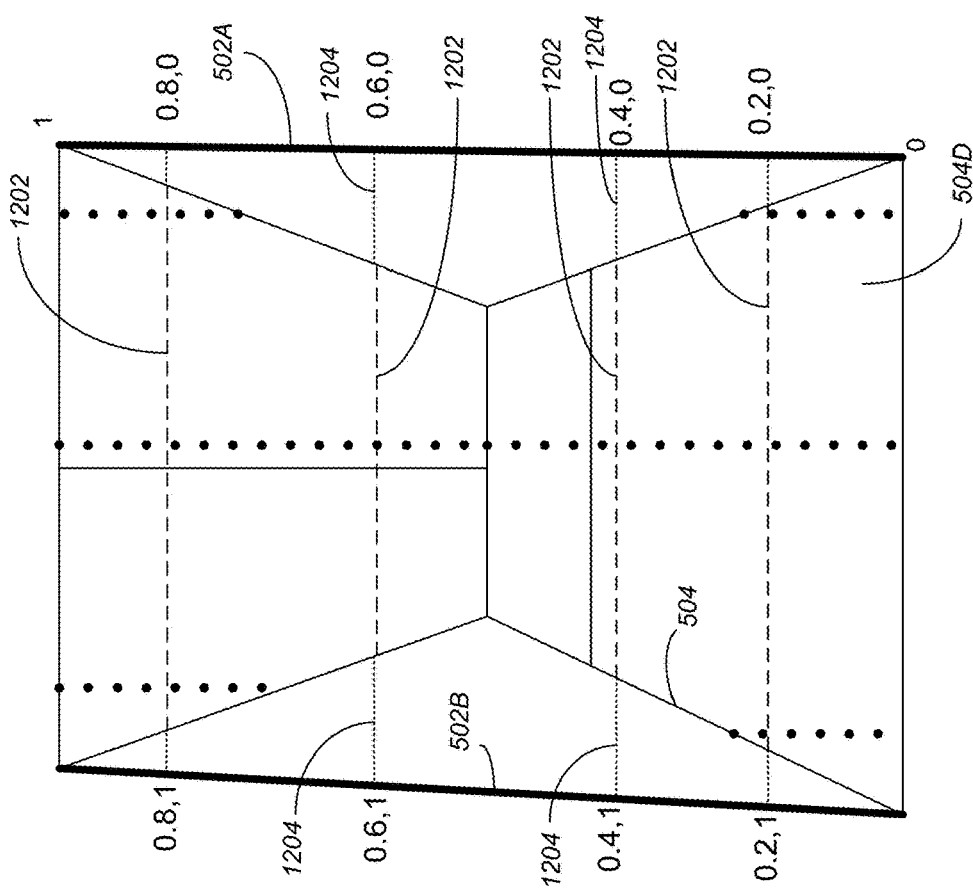
FIG. 12 illustrates a cut option for patterning a multi-surface target surface based on section planes in accordance with one or more embodiments of the invention.

For purposes of illustration the pattern of FIG. 4 is being utilized. FIG. 12 illustrates a cut option for patterning a multi-surface target surface 504 based on section planes 802 in accordance with one or more embodiments of the invention (e.g., steps 312-316). FIG. 13 illustrates an isometric view of the 3D multi-surface patterning results of cuboid objects patterned onto a target surface based on the cut option illustrated in FIG. 12. The cut option works differently than the stretch-and-squeeze option. The two guide curves (502A and 502B) implicitly define the width and the length of the surface from which the base surface pattern will then be projected onto the surfaces 504 to be patterned. In such an implementation, the intersection curve extends from the first guide curve 502A to the second guide curve 502B (and in addition, points not intersecting with the input target multi-surface may be filtered out such that an object is not placed onto a point that has been filtered out). To create the extended intersection curve (also referred to as the single continuous curve), the closest intersection curve to a first guide curve 502 is identified (for a first section plane of the section planes). Thereafter, an auxiliary curve is determined in a direction from the first guide curve 502 towards the closest intersection curve for the first section plane. A blended single continuous curve with G1 continuity connecting the two curves (i.e., the closest intersection curve with the auxiliary curve) is created to bridge the gap (if one exists). Thereafter, the auxiliary curve and the blended single continuous curve are added to the intersection curve (e.g., resulting in an intersection curve that incorporates the prior intersecting curves, the auxiliary curve, and the blended single continuous curve). This process of creating the extended intersection curve may be repeated for each section plane.

The two guide curves 502A and 502B are defining two opposing sites of an implicit surface, while the shape between the two curves 504 is defined by the sections. With this approach, a user can define the areas of the pattern that can/shall not be projected onto the reference surfaces (i.e., such a defined area is to be "cut away").

The complete implicit surface for the case is achieved the following way:

(1) For each needed U-point on the first guide curve 502A (e.g., 0.0, 0.1, 0.2, . . . ), a single continuous line is drawn to the corresponding U-point (0.0, 0.1, 0.2, . . . ) of the second guide curve 502B. As illustrated, the single continuous curve includes the intersecting curves 1202 as well as any additional lines 1204 needed to connect the two curves 502. This line, together with a line perpendicular to the first guide curve 502A define the section plane for each U-point pair. Contrasting the single curve case to the two curve case, in the single curve case, the section plane for the single curve case is perpendicular to the single curve, while with two curves, the section plane connects the first curve and second curve.

(2) The resulting section (i.e., the resulting section where the pattern will be projected/mapped) of each section plane is only defined on the area where the planes intersect the surfaces 504 to be patterned. To achieve the "cut" effect, the intersections get a connecting curve (if needed) on both sides (i.e., the additional lines 1204), to the first guide curve 502A and the second guide curve 502B. In this regard, when mapping the points from the pattern onto the surface 504, the full single continuous curve is utilized. However, any points not intersecting with an actual surface 504 are filtered out such that they are cut from the patterning and no objects will be generated for/placed onto those points. Thus, in such an implementation, the single continuous curve may consist of the intersecting curves and one or more bridging curves between the first guide curve 502A and the second guide curve 502B and the input target multi-surface 504.

One may note that the connecting curve (dotted line) may not be needed if the first guide curve 502A and second guide curve 502B are within the bounds of the surfaces 504. Regardless, to generate the single continuous curve between the two guide curves 502, each guide curve assumes U-values between 0 and 1 and the continuous curve connecting the two guide curves are relative, and the U values for the first curve 502A and second curve 502B correspond and are mapped to each other relatively.

Figure 14:
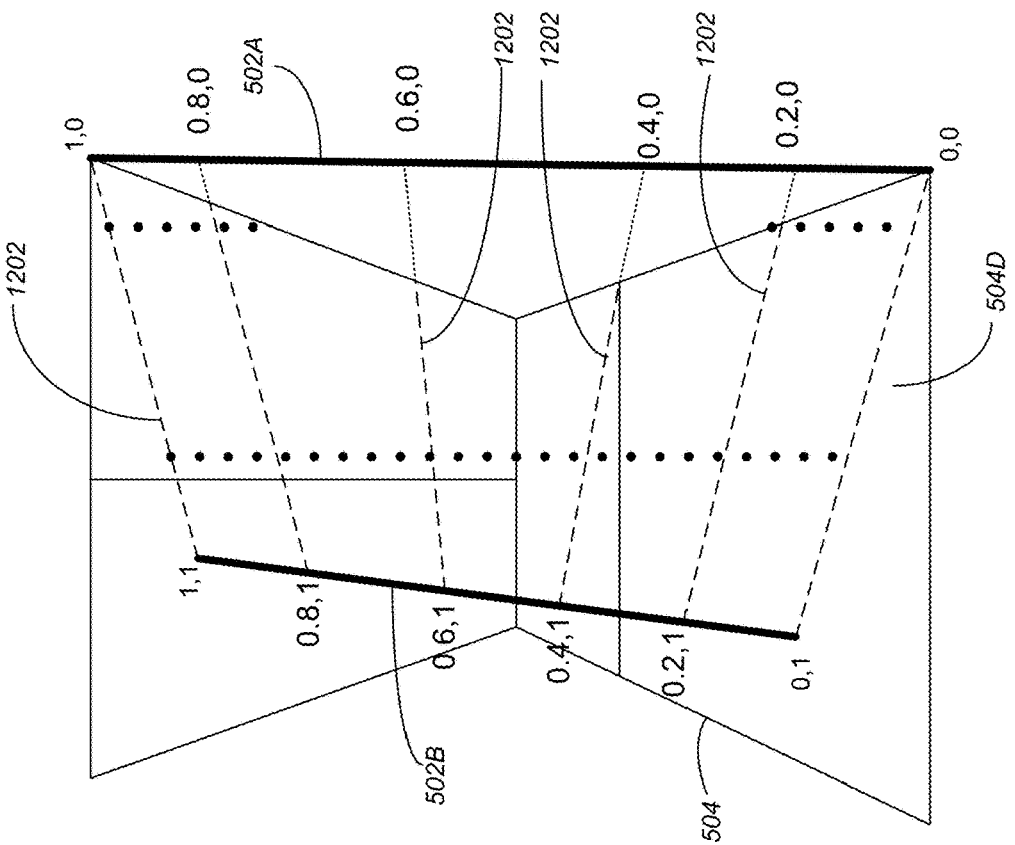
FIG. 14 illustrates the first guide curve and second guide curve of different lengths where the cut option has been utilized in accordance with one or more embodiments of the invention.

In another example, FIG. 14 illustrates the first guide curve 502A and second guide curve 502B of different lengths where the cut option has been utilized. As illustrated, section planes 1202 extend from the first guide curve 502A to the second guide curve 502B with the UV values corresponding to each other (i.e., from the first guide curve 502A to the second guide curve 502B, the UV values correspond—(0,0):(0,1), (0.2,0):(0.2,1), (0.4,0):(0.4,1), (0.6,0):(0.6,1), etc.). To perform the cut operation, the additional lines (i.e., illustrated as dotted lines) to create the section planes 1202 extend from the first guide curve 502A to the surface 504. The result of the cut option includes the cutting (or not placement) of points in the areas that don't intersect with the surface 504 while maintaining the original spacing of the pattern.

Figure 15:
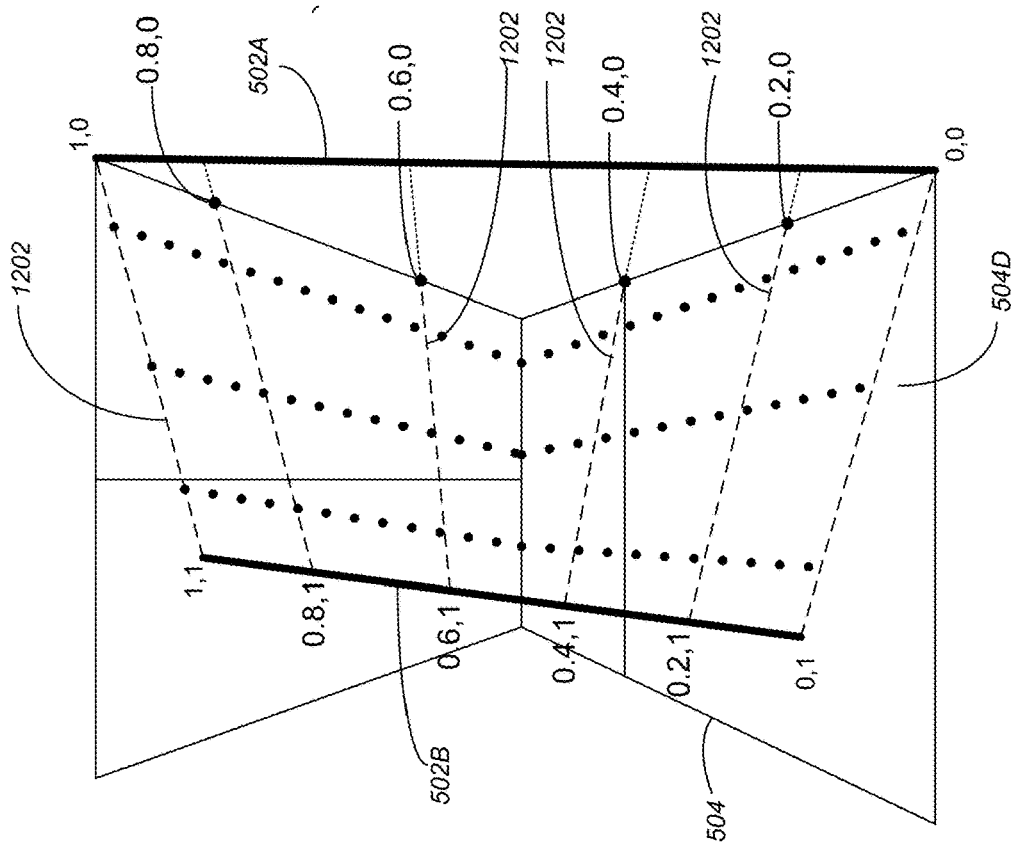
FIG. 15 illustrates the squeeze-and-stretch option with guide curves of different lengths in accordance with one or more embodiments of the invention.

In contrast to the cut option of FIG. 14, FIG. 15 illustrates the squeeze-and-stretch option with guide curves of different lengths. As illustrated, the U values correspond to each other to create the section planes 1202. However, the pattern has been squeezed based on the two guide curves 502 and the intersection with the target surface 504.

As can be seen, a variety of different options may be available using two guide curves including combinations of the cut/stretch/squeeze options. For example, options may include squeezing a portion of the pattern (e.g., closest to either curve) while also cutting the pattern not intersecting a surface. In another example, the pattern may be stretched (e.g., neither guide curve intersects with the target surface such that it covers an area larger than the target surface), and the pattern may be cut in areas that don't intersect with the target surface. Other variations are possible and are within the scope of the invention described herein.

Hardware Embodiments

Figure 16:
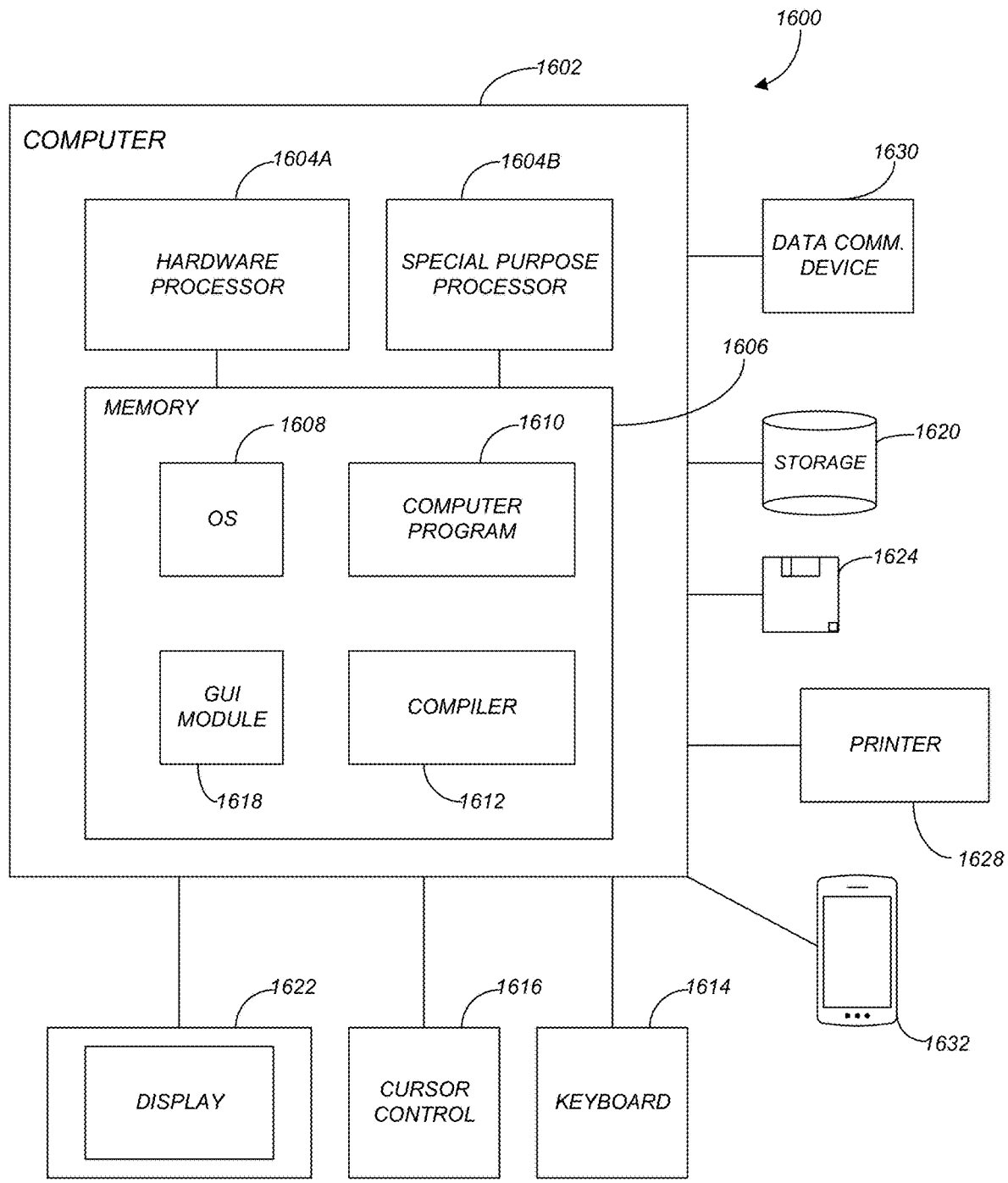
FIG. 16 is an exemplary hardware and software environment used to implement one or more embodiments of the invention.

FIG. 16 is an exemplary hardware and software environment 1600 (referred to as a computer-implemented system and/or computer-implemented method) used to implement one or more embodiments of the invention. The hardware and software environment includes a computer 1602 and may include peripherals. Computer 1602 may be a user/client computer, server computer, or may be a database computer. The computer 1602 comprises a hardware processor 1604A and/or a special purpose hardware processor 1604B (hereinafter alternatively collectively referred to as processor 1604) and a memory 1606, such as random access memory (RAM). The computer 1602 may be coupled to, and/or integrated with, other devices, including input/output (I/O) devices such as a keyboard 1614, a cursor control device 1616 (e.g., a mouse, a pointing device, pen and tablet, touch screen, multi-touch device, etc.) and a printer 1628. In one or more embodiments, computer 1602 may be coupled to, or may comprise, a portable or media viewing/listening device 1632 (e.g., an MP3 player, IPOD, NOOK, portable digital video player, cellular device, personal digital assistant, etc.). In yet another embodiment, the computer 1602 may comprise a multi-touch device, mobile phone, gaming system, internet enabled television, television set top box, or other internet enabled device executing on various platforms and operating systems.

In one embodiment, the computer 1602 operates by the hardware processor 1604A performing instructions defined by the computer program 1610 (e.g., a computer-aided design [CAD] application and/or a script) under control of an operating system 1608. The computer program 1610 and/or the operating system 1608 may be stored in the memory 1606 and may interface with the user and/or other devices to accept input and commands and, based on such input and commands and the instructions defined by the computer program 1610 and operating system 1608, to provide output and results.

Output/results may be presented on the display 1622 or provided to another device for presentation or further processing or action. In one embodiment, the display 1622 comprises a liquid crystal display (LCD) having a plurality of separately addressable liquid crystals. Alternatively, the display 1622 may comprise a light emitting diode (LED) display having clusters of red, green and blue diodes driven together to form full-color pixels. Each liquid crystal or pixel of the display 1622 changes to an opaque or translucent state to form a part of the image on the display in response to the data or information generated by the processor 1604 from the application of the instructions of the computer program 1610 and/or operating system 1608 to the input and commands. The image may be provided through a graphical user interface (GUI) module 1618. Although the GUI module 1618 is depicted as a separate module, the instructions performing the GUI functions can be resident or distributed in the operating system 1608, the computer program 1610, or implemented with special purpose memory and processors.

In one or more embodiments, the display 1622 is integrated with/into the computer 1602 and comprises a multi-touch device having a touch sensing surface (e.g., track pod or touch screen) with the ability to recognize the presence of two or more points of contact with the surface. Examples of multi-touch devices include mobile devices (e.g., IPHONE, NEXUS S, DROID devices, etc.), tablet computers (e.g., IPAD, HP TOUCHPAD, SURFACE Devices, etc.), portable/handheld game/music/video player/console devices (e.g., IPOD TOUCH, MP3 players, NINTENDO SWITCH, PLAYSTATION PORTABLE, etc.), touch tables, and walls (e.g., where an image is projected through acrylic and/or glass, and the image is then backlit with LEDs).

Some or all of the operations performed by the computer 1602 according to the computer program 1610 instructions may be implemented in a special purpose processor 1604B. In this embodiment, some or all of the computer program 1610 instructions may be implemented via firmware instructions stored in a read only memory (ROM), a programmable read only memory (PROM) or flash memory within the special purpose processor 1604B or in memory 1606. The special purpose processor 1604B may also be hardwired through circuit design to perform some or all of the operations to implement the present invention. Further, the special purpose processor 1604B may be a hybrid processor, which includes dedicated circuitry for performing a subset of functions, and other circuits for performing more general functions such as responding to computer program 1610 instructions. In one embodiment, the special purpose processor 1604B is an application specific integrated circuit (ASIC).

The computer 1602 may also implement a compiler 1612 that allows an application or computer program 1610 written in a programming language such as C, C++, Assembly, SQL, PYTHON, PROLOG, MATLAB, RUBY, RAILS, HASKELL, or other language to be translated into processor 1604 readable code. Alternatively, the compiler 1612 may be an interpreter that executes instructions/source code directly, translates source code into an intermediate representation that is executed, or that executes stored precompiled code. Such source code may be written in a variety of programming languages such as JAVA, JAVASCRIPT, PERL, BASIC, etc. After completion, the application or computer program 1610 accesses and manipulates data accepted from I/O devices and stored in the memory 1606 of the computer 1602 using the relationships and logic that were generated using the compiler 1612.

The computer 1602 also optionally comprises an external communication device such as a modem, satellite link, Ethernet card, or other device for accepting input from, and providing output to, other computers 1602.

In one embodiment, instructions implementing the operating system 1608, the computer program 1610, and the compiler 1612 are tangibly embodied in a non-transitory computer-readable medium, e.g., data storage device 1620, which could include one or more fixed or removable data storage devices, such as a zip drive, floppy disc drive 1624, hard drive, CD-ROM drive, tape drive, etc. Further, the operating system 1608 and the computer program 1610 are comprised of computer program 1610 instructions which, when accessed, read and executed by the computer 1602, cause the computer 1602 to perform the steps necessary to implement and/or use the present invention or to load the program of instructions into a memory 1606, thus creating a special purpose data structure causing the computer 1602 to operate as a specially programmed computer executing the method steps described herein. Computer program 1610 and/or operating instructions may also be tangibly embodied in memory 1606 and/or data communications devices 1630, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 1602.

Figure 17:
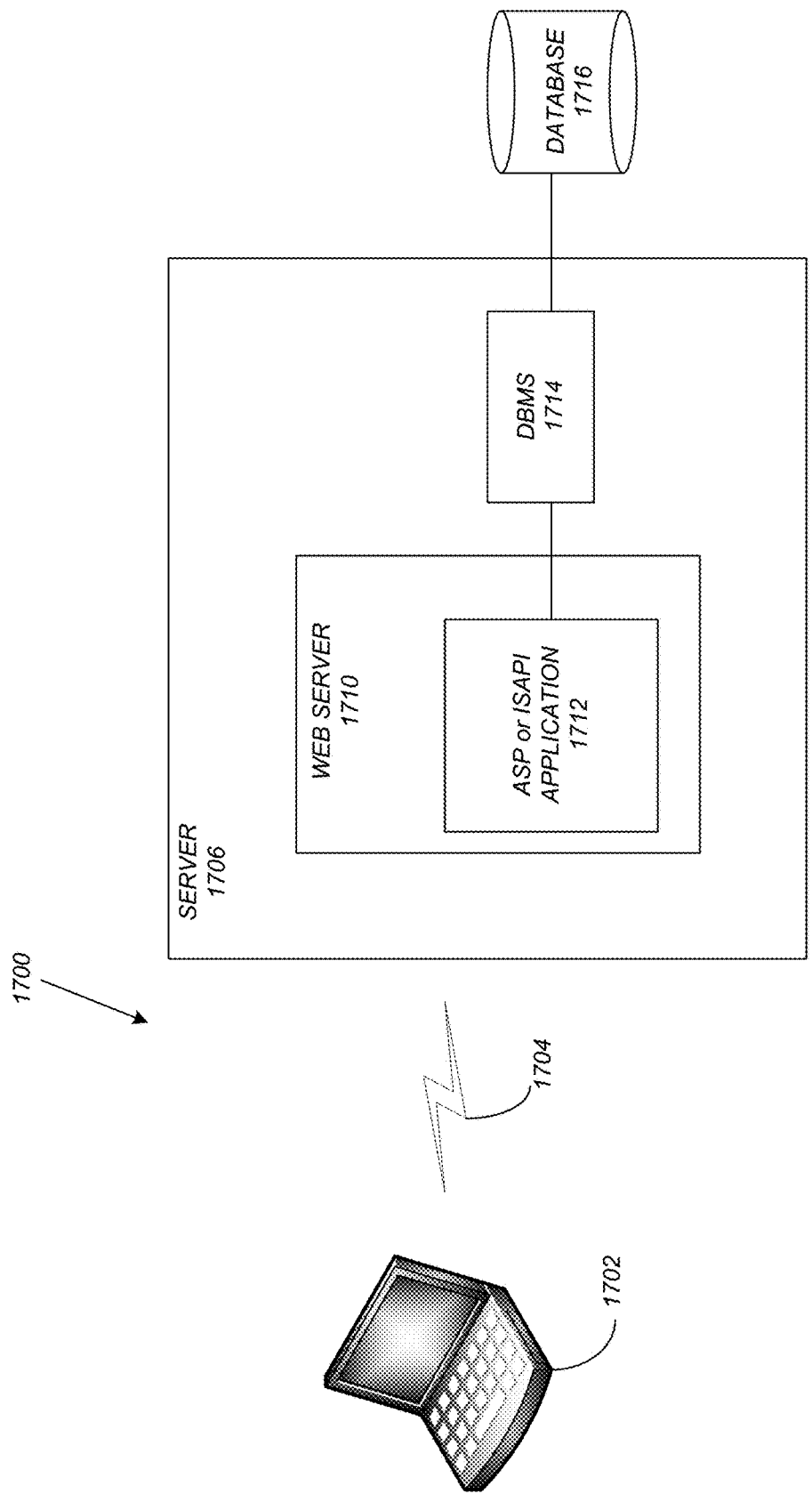
FIG. 17 schematically illustrates a typical distributed/cloud-based computer system using a network to connect client computers to server computers in accordance with one or more embodiments of the invention.

FIG. 17 schematically illustrates a typical distributed/cloud-based computer system 1700 using a network 1704 to connect client computers 1702 to server computers 1706. A typical combination of resources may include a network 1704 comprising the Internet, LANs (local area networks), WANs (wide area networks), SNA (systems network architecture) networks, or the like, clients 1702 that are personal computers or workstations (as set forth in FIG. 16), and servers 1706 that are personal computers, workstations, minicomputers, or mainframes (as set forth in FIG. 16). However, it may be noted that different networks such as a cellular network (e.g., GSM [global system for mobile communications] or otherwise), a satellite based network, or any other type of network may be used to connect clients 1702 and servers 1706 in accordance with embodiments of the invention.

A network 1704 such as the Internet connects clients 1702 to server computers 1706. Network 1704 may utilize ethernet, coaxial cable, wireless communications, radio frequency (RF), etc. to connect and provide the communication between clients 1702 and servers 1706. Further, in a cloud-based computing system, resources (e.g., storage, processors, applications, memory, infrastructure, etc.) in clients 1702 and server computers 1706 may be shared by clients 1702, server computers 1706, and users across one or more networks. Resources may be shared by multiple users and can be dynamically reallocated per demand. In this regard, cloud computing may be referred to as a model for enabling access to a shared pool of configurable computing resources.

Clients 1702 may execute a client application or web browser and communicate with server computers 1706 executing web servers 1710. Such a web browser is typically a program such as MICROSOFT INTERNET EXPLORER/EDGE, MOZILLA FIREFOX, OPERA, APPLE SAFARI, GOOGLE CHROME, etc. Further, the software executing on clients 1702 may be downloaded from server computer 1706 to client computers 1702 and installed as a plug-in or ACTIVEX control of a web browser. Accordingly, clients 1702 may utilize ACTIVEX components/component object model (COM) or distributed COM (DCOM) components to provide a user interface on a display of client 1702. The web server 1710 is typically a program such as MICROSOFT'S INTERNET INFORMATION SERVER.

Web server 1710 may host an Active Server Page (ASP) or Internet Server Application Programming Interface (ISAPI) application 1712, which may be executing scripts. The scripts invoke objects that execute business logic (referred to as business objects). The business objects then manipulate data in database 1716 through a database management system (DBMS) 1714. Alternatively, database 1716 may be part of, or connected directly to, client 1702 instead of communicating/obtaining the information from database 1716 across network 1704. When a developer encapsulates the business functionality into objects, the system may be referred to as a component object model (COM) system. Accordingly, the scripts executing on web server 1710 (and/or application 1712) invoke COM objects that implement the business logic. Further, server 1706 may utilize MICROSOFT'S TRANSACTION SERVER (MTS) to access required data stored in database 1716 via an interface such as ADO (Active Data Objects), OLE DB (Object Linking and Embedding DataBase), or ODBC (Open DataBase Connectivity).

Generally, these components 1700-1716 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 1702 and 1706 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 1702 and 1706. Embodiments of the invention are implemented as a software/CAD application on a client 1702 or server computer 1706. Further, as described above, the client 1702 or server computer 1706 may comprise a thin client device or a portable device that has a multi-touch-based display.

Conclusion

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for multi-surface patterning comprising:

obtaining, in a three-dimensional (3D) computer-aided design (CAD) surface computer application, an input target multi-surface comprised of multiple 3D CAD target surfaces;

obtaining, in the 3D CAD surface computer application, a first guide curve with respect to the multiple 3D CAD target surfaces;

obtaining, in the 3D CAD surface computer application, a pattern, wherein the pattern comprises pattern points to be patterned onto the input target multi-surface;

creating, in the 3D CAD surface computer application, one or more section planes based on the pattern and the first guide curve;

intersecting, in the 3D CAD surface computer application, the one or more section planes with each of the multiple 3D CAD target surfaces resulting in an intersection curve for each of the multiple 3D CAD target surfaces, wherein the intersection curve for each of the multiple 3D CAD target surfaces lies on each of the multiple 3D CAD target surfaces;

creating, in the 3D CAD surface computer application, a single continuous curve from the intersecting curves, wherein the single continuous curve connects the intersecting curves, and wherein the single continuous curve enables control of a pattern distribution, of the pattern points, via modification of the single continuous curve;

identifying, in the 3D CAD surface computer application, one or more of the pattern points based on the continuous curve, the first guide curve and the pattern, wherein each of the one or more pattern points identifies a position on the multiple 3D CAD target surfaces where an instance of an object will be placed; and generating and placing, in the 3D CAD surface computer application, multiple instances of the object at the identified positions on the multiple 3D CAD target surfaces based on the identified one or more pattern points.

2. The computer-implemented method of claim 1, wherein the pattern comprises an arbitrary pattern.

3. The computer-implemented method of claim 1, wherein the pattern comprises a grid pattern with the pattern points equally distributed across columns and rows.

4. The computer-implemented method of claim 1, wherein the pattern is specified with respect to UV space.

5. The computer-implemented method of claim 4, wherein the first guide curve provides an implicit U-value of each of the pattern points.

6. The computer-implemented method of claim 1, wherein a number of the one or more section planes is based on the pattern points.

7. The computer-implemented method of claim 1, wherein the identifying one or more of the pattern points further comprises:
filtering out pattern points that do not lie on the input target multi-surface.

8. The computer-implemented method of claim 1, wherein:
the input pattern is a different size or orientation than that of the multiple 3D CAD target surfaces; and
the identifying one or more of the pattern points comprises stretching or squeezing the pattern onto the input target multi-surface based on a geometry of the input target multi surface and the single continuous curve.

9. The computer-implemented method of claim 1, wherein:
there is a gap between two of the intersection curves; and
the single continuous curve comprises the intersecting curves and a bridging curve that bridges the gap.

10. The computer-implemented method of claim 9, wherein the creating the single continuous curve comprises:
identifying a closest intersection curve to the first guide curve for a first section plane of the one or more section planes;
determining an auxiliary curve in a direction from the first guide curve towards the closest intersection curve for the first section plane;
creating a blended single continuous curve with G1 continuity connecting the closest intersection curve with the auxiliary curve; and
adding the auxiliary curve and the blended single continuous curve to the intersection curve.

11. The computer-implemented method of claim 10, further comprising
obtaining a second guide curve, wherein the first guide curve and the second guide curve implicitly define a width and length of the input target multi-surface to be patterned;
wherein:
the intersection curve extends from the first guide curve to the second guide curve; and
pattern points not intersecting with the input target multi-surface are filtered out such that an instance of the object is not placed onto a pattern point that has been filtered out.

12. The computer-implemented method of claim 11, wherein the intersection curve comprises at least one bridging curve between the first guide curve or the second guide curve and the input target multi-surface.

13. A computer-implemented system for multi-surface patterning, comprising:
(a) a computer having a memory;
(b) a processor executing on the computer;
(c) the memory storing a set of instructions, wherein the set of instructions, when executed by the processor cause the processor to perform operations for a three-dimensional (3D) computer-aided design (CAD) surface computer application comprising:
(1) obtaining an input target multi-surface comprised of multiple 3D CAD target surfaces;
(2) obtaining a first guide curve with respect to the multiple 3D CAD target surfaces;
(3) obtaining a pattern, wherein the pattern comprises pattern points to be patterned onto the input target multi-surface;
(4) creating one or more section planes based on the pattern and the first guide curve;
(5) intersecting the one or more section planes with each of the multiple 3D CAD target surfaces resulting in an intersection curve for each of the multiple 3D CAD target surfaces, wherein the intersection curve for each of the multiple 3D CAD target surfaces lies on each of the multiple 3D CAD target surfaces;
(6) creating a single continuous curve from the intersecting curves, wherein the single continuous curve connects the intersecting curves, and wherein the single continuous curve enables control of a pattern distribution, of the pattern points, via modification of the single continuous curve;
(7) identifying one or more of the pattern points based on the continuous curve, the first guide curve and the pattern, wherein each of the one or more pattern points identifies a position on the multiple 3D CAD target surfaces where an instance of an object will be placed; and
(8) generating and placing multiple instances of the object at the identified positions on the multiple 3D CAD target surfaces based on the identified one or more pattern points.

14. The computer-implemented system of claim 13, wherein the pattern comprises an arbitrary pattern.

15. The computer-implemented system of claim 13, wherein the pattern comprises a grid pattern with the pattern points equally distributed across columns and rows.

16. The computer-implemented system of claim 13, wherein the pattern is specified with respect to UV space.

17. The computer-implemented system of claim 16, wherein the first guide curve provides an implicit U-value of each of the pattern points.

18. The computer-implemented system of claim 13, wherein a number of the one or more section planes are based on the pattern points.

19. The computer-implemented system of claim 13, wherein the operation identifying one or more of the pattern points further comprises:
    filtering out pattern points that do not lie on the input target multi-surface.

20. The computer-implemented system of claim 13, wherein:
    the input pattern is a different size or orientation than that of the multiple 3D CAD target surfaces; and
    the operation identifying one or more of the pattern points comprises stretching or squeezing the pattern onto the input target multi-surface based on a geometry of the input target multi surface and the single continuous curve.

21. The computer-implemented system of claim 13, wherein:
    there is a gap between two of the intersection curves; and
    the single continuous curve comprises the intersecting curves and a bridging curve that bridges the gap.

22. The computer-implemented system of claim 21, wherein the operation creating the single continuous curve comprises:
    identifying a closest intersection curve to the first guide curve for a first section plane of the one or more section planes;
    determining an auxiliary curve in a direction from the first guide curve towards the closest intersection curve for the first section plane;
    creating a blended single continuous curve with G1 continuity connecting the closest intersection curve with the auxiliary curve; and
    adding the auxiliary curve and the blended single continuous curve to the intersection curve.

23. The computer-implemented system of claim 13, wherein the operations further comprise:
    obtaining a second guide curve, wherein the first guide curve and the second guide curve implicitly define a width and length of the input target multi-surface to be patterned;
    wherein:
        the intersection curve extends from the first guide curve to the second guide curve; and
        pattern points not intersecting with the input target multi-surface are filtered out such that an instance of the object is not placed onto a pattern point that has been filtered out.

24. The computer-implemented system of claim 23, wherein the intersection curve comprises at least one bridging curve between the first guide curve or the second guide curve and the input target multi-surface.

* * * * *